J. J. SMITH.
SUPPORTING MEANS FOR AUTOMOBILE LIGHTS.
APPLICATION FILED APR. 27, 1921.

1,431,267.  Patented Oct. 10, 1922.

Witnesses:
W. Schnellhardt
J. D. Struve

Inventor
John J. Smith
His Joshua R. H. Potts
Attorney

Patented Oct. 10, 1922.

1,431,267

UNITED STATES PATENT OFFICE.

JOHN J. SMITH, OF CHICAGO, ILLINOIS.

SUPPORTING MEANS FOR AUTOMOBILE LIGHTS.

Application filed April 27, 1921. Serial No. 464,954.

*To all whom it may concern:*

Be it known that I, JOHN J. SMITH, a citizen of the United States, and a resident of the city of Chicago, county of Cook, and State of Illinois, have invented certain new and useful Improvements in Supporting Means for Automobile Lights, of which the following is a specification.

My invention relates to supporting means for automobile light, and has for its object the provision of a support or bracket which will mount the light in such a position as to throw its rays always in the exact direction of travel.

Automobile lights are generally mounted on the frame or body of the automobile and consequently do not turn or swing with the front wheels as they swing and therefore do not throw the main rays of light directly in the path of travel while the automobile is turning.

I construct a bracket which I mount forward of the spindle body and preferably on the front end of the steering rod immediately behind the steering rod nut, which light therefore always swings with the front wheel and always throws its direct rays in the direction of travel.

Other objects will appear hereinafter.

The invention consists in the combinations and arrangements of parts hereinafter described and claimed.

The invention will be best understood by reference to the accompanying drawings forming a part of this specification, and in which, Fig. 1 is a front view of a portion of an automobile with my bracket mounted in position and supporting a light thereon;—

Figure 1:
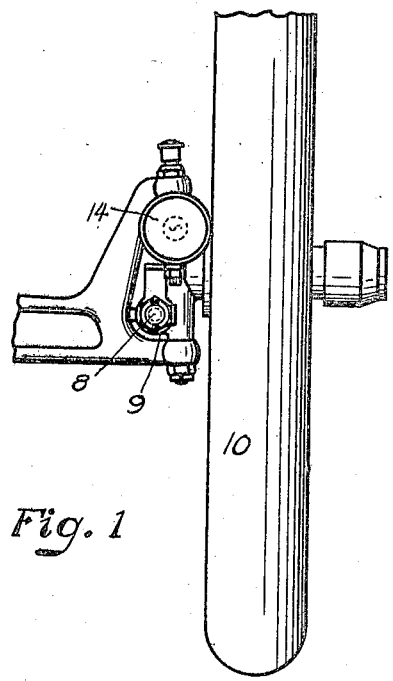
Figure 2:
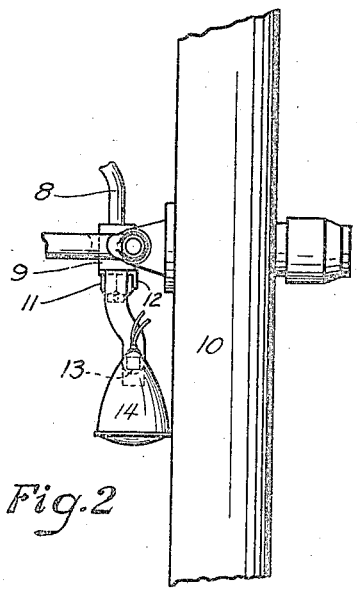
Fig. 2 is a plan view of the parts shown in Fig. 1.

The preferred form of bracket consists of a bar of steel or any suitable metal, which is bent to form two arms, 6 and 7 extending at right angles to each other. The arm 6 is provided with an opening with which it is mounted on the front end of the steering rod 8 extending through the steering knuckle 9 of the front wheel 10, and is held on said rod forward of the spindle body by steering rod nut 11. A lateral lug 12 is provided on the arm 6 and is bent up against the side of nut 11 to lock it in place. The arm 7 is curved and offset laterally away from the front axle, as best seen in Fig. 2, and is provided with an angular opening 13 at its forward end in which a light 14 is mounted by means of an angular portion on its stem 15 fitting in said opening.

Figure 3:
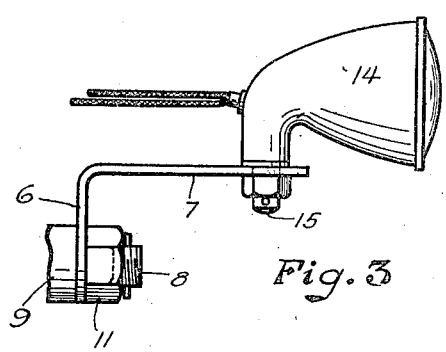
Fig. 3 is a side view of the bracket supporting a light and mounted on the steering rod, behind the steering rod nut; and, Fig. 4 is a perspective view of a modified form of bracket.
Figure 4:
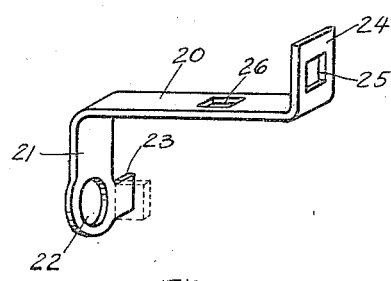

In the modified form illustrated in Fig. 4 the bracket comprises a main portion 20 provided at one end with a depending arm 21 having an opening 22 for attachment to the steering rod and a locking lug 23 similar to the opening and lug in the preferred form. The other end of said portion 20 is provided with an upstanding arm 24 having an angular opening 25 for attachment of the light, and a similar light engaging opening 26 is provided in the main portion 20. This bracket is adapted to mount a light with a bent vertical attaching arm in the opening 26, in the manner shown in Fig. 3 and also to mount a light with a straight or horizontal attaching arm in the opening 25. The brackets are both bent outward toward the wheel, as shown in Fig. 2, to permit a complete inward turning of said wheel and light without striking the light against the front axle.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:

1. In combination with an automobile, a bracket having a plurality of arms, one arm being mounted behind the steering rod nut and being provided with locking means for said nut, and another arm having means for supporting a light with either a vertical or a horizontal supporting stem to turn with the steering rod.

2. In combination with an automobile, a bracket having a vertical arm arranged for mounting said bracket on the forward portion of the steering rod, said arm being held in position by the steering rod nut, a horizontal arm integral with said vertical arm, and adapted for mounting a light having a vertical supporting stem, a vertical extension on said arm, said extension being adapted for mounting a light having a horizontal supporting stem, and a lug on said vertical arm bent over to engage said steering rod nut and lock said bracket in position.

In testimony whereof I have signed my name to this specification in the presence of two subscribing witnesses.

JOHN J. SMITH.

Witnesses:
 JOSHUA R. H. POTTS,
 FREDA C. APPLETON.